US010405320B2

(12) United States Patent
Zhao et al.

(10) Patent No.: US 10,405,320 B2
(45) Date of Patent: Sep. 3, 2019

(54) RADIO RESOURCE MANAGEMENT SYSTEM AND RADIO RESOURCE MANAGEMENT METHOD

(71) Applicant: Sony Corporation, Tokyo (JP)

(72) Inventors: Youping Zhao, Beijing (CN); Yiqi Hu, Beijing (CN); Chen Sun, Beijing (CN); Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/400,474

(22) Filed: Jan. 6, 2017

(65) Prior Publication Data
US 2017/0118763 A1 Apr. 27, 2017

Related U.S. Application Data

(62) Division of application No. 14/736,374, filed on Jun. 11, 2015, now abandoned.

(30) Foreign Application Priority Data

Jun. 20, 2014 (CN) .......................... 2014 1 0280913

(51) Int. Cl.
H04W 72/00 (2009.01)
H04W 72/08 (2009.01)
(Continued)

(52) U.S. Cl.
CPC ......... H04W 72/082 (2013.01); H04W 4/025 (2013.01); H04W 16/14 (2013.01);
(Continued)

(58) Field of Classification Search
CPC ..... H04W 16/10; H04W 16/14; H04W 28/16; H04W 72/04; H04W 76/02; H04W 24/00;
(Continued)

(56) References Cited

U.S. PATENT DOCUMENTS

2012/0106364 A1* 5/2012 Kasslin ................. H04W 16/14
370/252
2012/0195270 A1* 8/2012 Kang .................... H04W 16/14
370/329

(Continued)

Primary Examiner — Khoi H Tran
Assistant Examiner — B M M Hannan
(74) Attorney, Agent, or Firm — Xsensus LLP

(57) ABSTRACT

The present disclosure provides a radio resource management system and method. The radio resource management system includes a control device for determining, based on geographical location information of at least one secondary system and at least one primary system managed by the radio resource management system, a radio resource available to the at least one secondary system among licensed radio resources of the at least one primary system when the primary system is not interfered with, the control device including a selection unit for selecting at least one object liable to be interfered with by the secondary system managed by another radio resource management system from the at least one primary system, from the at least one secondary system, or from the at least one primary system and the at least one secondary system based on the geographical location information; and a communication device for transmitting the geographical location information of the at least one object selected by the selection unit to the another radio resource management system. The present disclosure can reduce an information interaction between radio resource management systems.

13 Claims, 9 Drawing Sheets

(51) Int. Cl.
*H04W 76/10* (2018.01)
*H04W 16/14* (2009.01)
*H04W 4/02* (2018.01)
*H04W 48/20* (2009.01)
*H04W 64/00* (2009.01)

(52) U.S. Cl.
CPC ........... *H04W 48/20* (2013.01); *H04W 76/10* (2018.02); *H04W 64/003* (2013.01)

(58) Field of Classification Search
CPC ... H04W 28/04; H04W 72/082; H04W 16/12; H04W 74/02; H04W 84/042; H04W 72/0453; H04W 88/06; H04W 76/10; H04W 4/025; H04W 48/20
USPC .................................................. 455/450–454
See application file for complete search history.

(56) References Cited

U.S. PATENT DOCUMENTS

| | | | | |
|---|---|---|---|---|
| 2012/0282942 | A1* | 11/2012 | Uusitalo | H04W 16/14 455/452.2 |
| 2013/0293419 | A1* | 11/2013 | Negus | H04W 4/00 342/371 |
| 2016/0119882 | A1* | 4/2016 | Liu | H04W 52/243 455/422.1 |

* cited by examiner

RADIO RESOURCE MANAGEMENT SYSTEM AND RADIO RESOURCE MANAGEMENT METHOD

INCORPORATION BY REFERENCE

This application is a divisional of U.S. application Ser. No. 14/736,374, filed on Jun. 11, 2015, which claims priority to Chinese Application No. 201410280913.3 filed on Jun. 20, 2014. The disclosures of the applications referenced above are incorporated herein by reference in their entireties.

FIELD OF THE INVENTION

The present disclosure relates to radio resource management in wireless communication, and in particular, to a radio resource management system and a radio resource management method for managing usage of a radio resource of a secondary system in a communication system without interfering with a primary system in the communication system.

BACKGROUND OF THE INVENTION

With the development of wireless communication technology, radio resources are increasingly insufficient. To take full advantage of the limited radio resources, a practicable solution is to dynamically utilize those radio resources that have been allocated to a certain service but have not been sufficiently utilized. More specifically, with respect to a primary system having a right to use the radio resources, the radio resources that have not been sufficiently utilized by the primary system are allocated to an unlicensed secondary system without affecting the usage by the primary system, such that the secondary system appropriately utilizes the licensed radio resources of the primary system without affecting the usage of the radio resources by the primary system.

In order to ensure that the usage of radio spectrum resources by the respective primary system and secondary system is within an allowable interference range, in addition to impact of interference of the secondary system managed by the same radio resource management system (such as a geographical location information database, GLDB), impact of interference of the secondary system managed by an other adjacent radio resource management system (especially, the secondary system located at an edge of coverage range of the radio resource management system) shall be considered. In this case, interaction of information of the secondary systems managed by different radio resource management systems is typically performed therebetween, so as to ensure that the secondary system managed by the radio resource management system does not bring an adverse effect to communication quality of the primary system and/or the secondary system managed by the adjacent radio resource management system. However, how to save an overhead of the information interaction between the radio resource management systems, thus to improve efficiency of information interaction is a problem to be solved urgently.

It should be noted here that the above description is just a description made on the background of the present disclosure, and is not necessarily intended to constitute the prior art.

SUMMARY OF THE INVENTION

A brief summary of the present disclosure is given below, so as to provide a basic understanding on some aspects of the present disclosure. It will be understood that the summary is not an exhaustive description of the present disclosure. It is not intended to define a key or important part of the present disclosure, nor is it intended to limit the scope of the present disclosure. It is intended to give some concepts in a simplified manner, as a preface to the more detailed description described later.

In view of the above drawbacks of the prior art, one of the objects of the present disclosure is to provide a radio resource management system and a radio resource management method, to overcome at least the problems existing in the prior art.

According to one embodiment of the present disclosure, there is provided a radio resource management system including: a control device, configured to determine, based on geographical location information of at least one secondary system and at least one primary system managed by the radio resource management system, a radio resource that is available to the at least one secondary system among licensed radio resources of the at least one primary system in the case that the primary system is not interfered with, the control device including: a selection unit, configured to select at least one object that is liable to be interfered with by the secondary system managed by another radio resource management system from the at least one primary system, from the at least one secondary system, or from the at least one primary system and the at least one secondary system based on the geographical location information; and a communication device, configured to transmit the geographical location information of the at least one object selected by the selection unit to the another radio resource management system.

According to another embodiment of the present disclosure, there is provided a radio resource management system including: a control device, configured to determine, based on geographical location information of at least one secondary system and at least one primary system managed by the radio resource management system, a radio resource that is available to the at least one secondary system among licensed radio resources of the at least one primary system in the case that the primary system is not interfered with, the control device including: an aggregation unit, configured to equate at least two secondary systems that are geographically closed to each other among the secondary systems managed by the radio resource management system to one equivalent secondary system; and a communication device, configured to transmit radio resource usage information and the geographical location information of the equivalent secondary system to another radio resource management system, so as to assist an interference coordination with the another radio resource management system.

According to still another embodiment of the present disclosure, there is provided a radio resource management method including: a control step, for determining, based on geographical location information of at least one secondary system and at least one primary system managed by a radio resource management system, a radio resource that is available to the at least one secondary system among licensed radio resources of the at least one primary system in the case that the primary system is not interfered with, the control step further including: selecting at least one object that is liable to be interfered with by the secondary system managed by another radio resource management system from the at least one primary system, from the at least one secondary system, or from the at least one primary system and the at least one secondary system based on the geographical location information; and a transmission step, for transmitting the geographical location information of the selected at least one object to the another radio resource management system.

According to still another embodiment of the present disclosure, there is provided a radio resource management method including: a control step, for determining, based on geographical location information of at least one secondary system and at least one primary system managed by a radio resource management system, a radio resource that is available to the at least one secondary system among licensed radio resources of the at least one primary system in the case that the primary system is not interfered with, the control step including: equating at least two secondary systems that are geographically closed to each other among the secondary systems managed by the radio resource management system to one equivalent secondary system; and a transmission step, for transmitting radio resource usage information and the geographical location information of the equivalent secondary system to another radio resource management system, so as to assist an interference coordination with the another radio resource management system.

Additionally, an embodiment of the present disclosure provides a computer program for implementing the above mentioned radio resource management method.

Furthermore, an embodiment of the present disclosure provides a corresponding computer-readable storage medium on which the computer program code for implementing the above mentioned radio resource management method is stored.

The radio resource management system and the radio resource management method according to embodiments of the present disclosure can realize at least one of the following beneficial effects: on the premise of ensuring communication quality of an object managed by the radio resource management system, substantially reducing an overhead of data information interaction.

Through the following detailed description of the best mode of the present disclosure in conjunction with the accompanying drawings, these and other advantages of the present disclosure will become more apparent.

BRIEF DESCRIPTION OF THE DRAWINGS

The present disclosure may be understood better with reference to the description provided in conjunction with the accompanying drawings, wherein the same or similar reference signs are used to represent the same or similar components in all figures. The figures and the following detailed description are included in the specification and form a part of the specification, and used to further illustrate preferred embodiments of the present disclosure and explain principle and object of the present disclosure by examples. Wherein.

Figure 1:
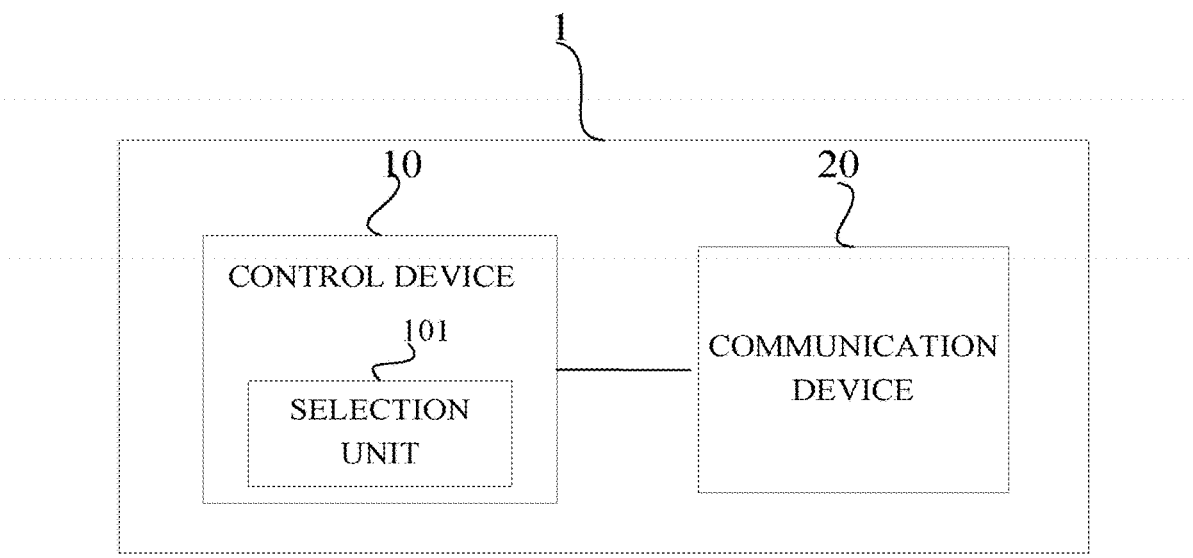
FIG. 1 is an exemplary block diagram schematically illustrating a radio resource management system according to a first embodiment of the present disclosure.

Those skilled in the art should understand that elements in the figures are illustrated for simplicity and clarity, and are not necessarily drawn to scale. For example, size of some elements in the accompanying drawings may be enlarged with respect to other elements, so as to facilitate improving understanding of the embodiments of the present disclosure.

DETAILED DESCRIPTION OF THE INVENTION

Exemplary embodiments of the present disclosure are described below in conjunction with the accompanying drawings. For the sake of clarity and conciseness, not all features of actual implementations are described in the specification. However, it is to be understood that during developing any of such actual implementations, numerous implementation-specific decisions shall be made to achieve the developer's specific goals, for example, compliance with system-related and business-related constraints which will vary from one implementation to another. Moreover, it is also to be understood that such a development effort might be very complex and time-consuming, but will nevertheless be a routine task for those skilled in the art having the benefit of this disclosure.

It is further noted that only device structures and/or process steps closely related to implementing the present disclosure are illustrated in the drawings while omitting other details less related to the present disclosure so as not to obscure the present disclosure due to those unnecessary details.

The present disclosure provides a radio resource management system and a radio resource management method for, on the premise of ensuring communication quality between the radio resource management system and an adjacent radio resource management system, effectively reducing an information interaction between these radio resource management systems.

System Environment

Firstly, a system environment in which a radio resource management system of the present disclosure is located will be described briefly. The system environment on which design of the present disclosure is based includes a primary system and at least one secondary system. The primary system is the license owner of the licensed spectrum band, for example, to freely utilize a corresponding spectrum resource according to a service requirement thereof, and there may be a plurality of users (primary users) in the primary system. The secondary system may be a system which is not the license owner of the licensed spectrum and only opportunistically uses the spectrum to perform a communication when the primary system does not occupy the spectrum, and there may be a plurality of users (secondary users) in the secondary system. In one example, the primary system is a terrestrial television broadcast system, the primary user is a television terminal or a broadcast terminal, the secondary system is a WIFI system utilizing the UHF band (TV broadcast special band), and the secondary user is a user equipment that performs a WIFI technology-based communication by using the UHF band. Furthermore, the secondary system may also be an other system that needs to use a spectrum resource (such as the UHF band) to perform the communication, such as an intelligent meter reading system. Alternatively, the secondary system may also be a license owner of the licensed spectrum, but lower priority than that of the primary system with respect to the spectrum usage. For example, when an operator is deploying a new base station to provide a new service, an existing base station and the provided service are regarded as the primary system and has a priority of spectrum usage. As another example, the primary system is a terrestrial television broadcast system, or is a first mobile communication system that is licensed to operate on a first band set and maintained by a first mobile operator, and the secondary system is a second mobile communication system that is licensed to operate on a second band set and maintained by a second mobile operator. Note that, the secondary system opportunistically uses a resource in the unlicensed UHF band or the first band set in the case that the primary system is not interfered with. Specifically, for example, the second communication system aggregates carriers on the licensed band and the unlicensed band based on the carrier aggregation technique regulated in LTE-A.

Note that, the unlicensed spectrum resource that is available to the secondary system may refer to at least one of a specific frequency range, utilization time in a corresponding frequency range, transmission power, and the like. Furthermore, the situation in which the primary system is not interfered with includes that the generated interference is within a tolerance limit range of the primary system and does not affect a normal operation of the primary system.

It is known to the inventor that the most prevailing approach of protecting the primary system is to store coverage information of the primary system in a database. The database also stores an interference limit that is tolerable to the primary system. The secondary system shall firstly access the database before utilizing the spectrum of the primary system in the same region and submits state information of the secondary system, such as location information, a spectrum emission mask, a transmission bandwidth and a carrier frequency. Then, the database calculates an interference amount on the primary system by the secondary system according to the state information of the secondary system, and calculates an expected spectrum resource available to the secondary system under the current state according to the calculated interference amount on the primary system by the secondary system. The radio resource management system of the present disclosure may be configured as such a database, or is independent of the database and performs a communication with the database, so as to obtain corresponding information.

Various embodiments will be described below with reference to the specific content of the present disclosure.

First Embodiment

FIG. 1 is an exemplary block diagram schematically illustrating a radio resource management system according to a first embodiment of the present disclosure.

As shown in FIG. 1, the radio resource management system 1 includes a control device 10, based on geographical location information of at least one secondary system and at least one primary system managed by the radio resource management system, a radio resource that is available to at least one secondary system among licensed radio resources of at least one primary system in the case that the primary system is not interfered with, wherein the control device including a selection unit 101 for selecting at least one object that is liable to be interfered with by the secondary system managed by another radio resource management system from the at least one primary system, from the at least one secondary system, or from the at least one primary system and the at least one secondary system based on the geographical location information; and a communication device 20 for transmitting the geographical location information of the at least one object selected by the selection unit to the another radio resource management system.

According to the present disclosure, the radio resource management system 1 and the another radio resource management system that performs an information interaction with the radio resource management system 1 may be a geographical location information database (GLDB) for managing information of communication system (including a primary system and a secondary system) within a specific range, or an advanced location engine (AGE) that covers communication systems within the specific range, or a network side apparatus such as an eNodeB or a baseband cloud. In addition, the radio resource management system 1 may be a separate entity that is independent of the primary system and the secondary system, or a combination of a plurality of entities distributed on the respective primary system and secondary system.

According to an embodiment of the present disclosure, the primary system managed by the radio resource management system 1 may be a system having a right to use a licensed spectrum, typically including a primary base station and a primary user. Correspondingly, the secondary system may be a system having no right to use the licensed radio resource, typically including a secondary base station and a secondary user. According to another embodiment of the present disclosure, the primary system and the secondary system may both have the right to use the radio resource, but the priority of spectrum usage of the primary system is higher than that of the secondary system. For example, the primary system managed by the radio resource management system 1 may be a terrestrial television broadcast system, and the secondary system may be a cognitive radio communication system. Other examples and explanations may refer to the above described system environment section, and is not described in detail herein.

According to an embodiment of the present disclosure, the secondary system may include the secondary base station and the secondary user, or include only the secondary user (for example, the case where the secondary base station is not provided, and the secondary user is directly managed by the radio resource management system). Therefore, in the description of the present disclosure, the secondary user is broadly referred to a secondary system so as to cover the above situation.

More specifically, an implementation of the secondary system according to the present disclosure may be a mobile terminal (such as a smart phone, a tablet personal computer (PC), a notebook PC, a portable game terminal, a portable/dongle type mobile router and a digital imaging device), an in-vehicle terminal (such as a vehicle navigation apparatus), a terminal performing a machine-to-machine (M2M) communication (also referred to as a machine type communication (MTC) terminal), or a terminal performing a device-to-device (D2D) communication, for example. These terminals operable as the secondary system may be based on the WIFI communication technology, including various wireless communication techniques such as the cellular mobile communication techniques in LTE, LTE-A, LTE-U (LTE-Unlicensed), an the like, and the used spectrum resources include the unlicensed resource.

Additionally, the secondary system according to the embodiment of the present disclosure may be not only a secondary system entity that is being in operation currently, but also a secondary system that is expected to operate, such as a secondary system that is in OFF state currently but may be switched on momentarily. For example, when the secondary system is a mobile terminal, it may also be a place within a management range of the radio resource management system, to which a probability that the secondary system moves to operate is high.

According to an embodiment of the present disclosure, the control device 10 may determine an interference situation of the primary system by the secondary system managed by the radio resource management system 1 and an interference situation of the primary system by the secondary system managed by an adjacent radio resource management system, based on the geographical location information of the at least one secondary system and the at least one primary system managed by the radio resource management system, so as to determine the radio resource that is available to the at least one secondary system among the licensed radio resources of the at least one primary system.

Typically, it is necessary to ensure that usage of the unlicensed radio resource by the secondary system does not interfere with the primary system, and the radio resource management system has a responsibility to protect the primary system registered in the management system from being interfered with by the secondary system managed by itself when performing a resource allocation for the secondary system managed by itself. In an embodiment of the present disclosure, the radio resource management system further considers an interference to the registered primary system by the secondary system managed by other radio resource management system, so as to better ensure a normal operation of the primary system.

Correspondingly, interaction of related information of the primary systems protected by the respective radio resource management systems need to be performed therebetween. According to an embodiment of the present disclosure, the selection unit 101 may select at least one primary system or primary user that is liable to be interfered with by the secondary system managed by the another radio resource management system (in other words, the primary system or primary user most in need of protection) from the at least one primary system managed by the radio resource management system 1 based on the geographical location information, and transmit the geographical location information of the at least one primary system or primary user selected by the selection unit 101 to the another radio resource management system via the communication device 20.

According to the embodiment, the radio resource management system purposefully selects some primary systems and performs the information interaction of these primary systems with the other radio resource management system. In comparison with the case of blindly performing an interaction of all unnecessary information of the primary system with the other radio resource management system, the radio resource management system in the embodiment of the present disclosure can effectively reduce a signaling overhead between systems, and improve the system safety at the same time. Unlike the primary system, the secondary system opportunistically uses the unlicensed radio resource, the usage of the unlicensed radio resource between the secondary systems may be based on collision, or may be coordinated according to certain rules. When these secondary systems are managed by the same radio resource management system, this radio resource management system can undertake a corresponding coordination task, thereby to improve the efficiency of using the unlicensed resource. When these secondary systems are managed by different radio resource management systems, only performing an internal coordination of the respective radio resource management systems can not avoid a collision between the secondary systems managed by two different management systems from occurring, and therefore an interaction of information on the respective secondary systems need to be performed between the respective radio resource management systems.

Additionally, not only the primary system, but also some of the secondary systems managed by the radio resource management system 1 require, for example, a QoS guarantee, yet other secondary systems do not require the QoS guarantee. Specifically, for example, a current service of the some secondary systems is a real time speech communication or other important service and requires the QoS guarantee, or a user of the some secondary systems has paid additional fees for the QoS guarantee. Accordingly, there is a need to consider impact on the secondary system requiring the QoS guarantee by other secondary system (including the secondary system managed by the radio resource management system (that is, the secondary system that is managed by the same radio resource management system) and the secondary system managed by the adjacent radio resource management system).

In this case, based on the geographical location information, the selection unit 101 may select the primary system and the secondary system that are liable to be interfered with by the secondary system managed by the another radio resource management system or need protection, as the at least one object that is liable to be interfered with by the secondary system managed by the another radio resource management system, among the primary system and the secondary system managed by the radio resource management system 1. According to the embodiment, the radio resource management system purposefully selects some primary systems and performs the information interaction of these primary systems with the other radio resource management system. In comparison with the case of blindly performing an interaction of all unnecessary information of the primary system with the other radio resource management system, the radio resource management system in the embodiment of the present disclosure can effectively reduce a signaling overhead between systems, and improve the system safety at the same time.

Therefore, the object that is liable to be interfered with by the secondary system managed by the another radio resource management system may be the primary system and the secondary system managed by the radio resource management system 1.

Although there has been described above that the selection unit 101 select the at least one object that is liable to be interfered with by the secondary system managed by the another radio resource management system from the at least one primary system or a combination of the at least one primary system and the at least one secondary system, the present disclosure is not limited thereto. According to an embodiment of the present disclosure, the radio resource management system 1 may also be configured to perform an information interaction of all registered primary systems with the another radio resource management system, and with respect to the secondary system, only select information of the secondary system that is liable to be interfered for interaction. In this case, the selection unit 101 may be configured to select at least one secondary system that is liable to be interfered with by the secondary system managed by the another radio resource management system from the secondary system managed by the radio resource management system 1, and the geographical location information of the at least one secondary system selected and all the primary systems is transmitted to the another radio resource management system by the communication device 20.

According to the present disclosure, the geographical location information of the at least one primary system and the at least one secondary system includes information on longitude and latitude. In addition, it may include information on antenna height. In some examples, the management range may be divided into a plurality of regions according to certain rules, and the geographical location information may be indicated by, for example, a region number.

Figure 2:
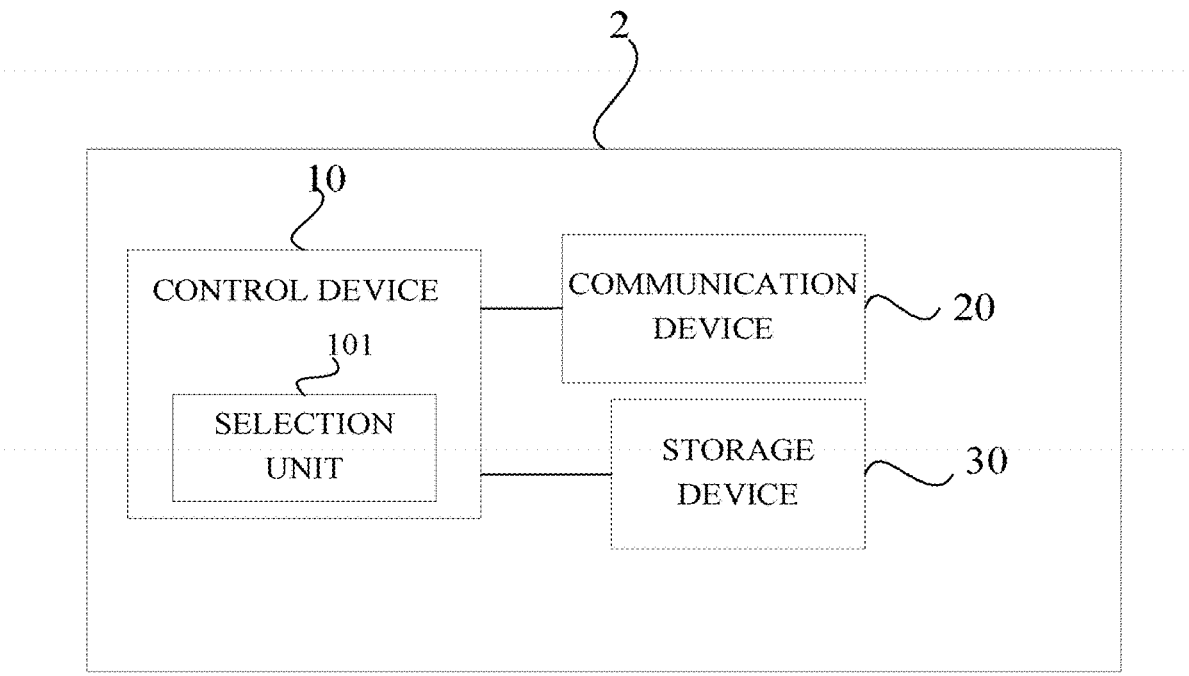
FIG. 2 is another exemplary block diagram schematically illustrating the radio resource management system according to the first embodiment of the present disclosure.

FIG. 2 is another exemplary block diagram schematically illustrating the radio resource management system according to the first embodiment of the present disclosure.

As shown in FIG. 2, in addition to the control device 10 and the communication device 20 as those included in the radio resource management system 1 in FIG. 1, the radio resource management system 2 further includes a storage device 30 for storing the geographical location information of the at least one secondary system and the at least one primary system, wherein the control device 10 is further configured to access the storage device 30 to obtain the geographical location information of the at least one secondary system and the at least one primary system.

According to an embodiment of the present disclosure, the storage device 30 is used for storing the geographical location information of all the primary systems and secondary systems registered in the radio resource management system 2 (for example, coordinates of the primary system and the secondary system, such as the information on longitude and latitude as well as antenna height of the primary system and the secondary system), such that the control device 10 can obtain the geographical location information of the primary system and the secondary system managed by the radio resource management system 2 by accessing the storage device 30.

Additionally, the storage device 30 according to the embodiment of the present disclosure stores transmission information of all the secondary systems managed by the radio resource management system 2, such as the transmission power and a channel identifier ID.

The selection unit 101 may determine a distance between the at least one primary system, the at least one secondary system or the at least one primary system and the at least one secondary system and a communication system region that is managed by the another radio resource management system based on the geographical location information of the at least one secondary system and the at least one primary system managed by the radio resource management system, and select at least one object according to the distance as the at least one object that is liable to be interfered with by the secondary system managed by the another radio resource management system. According to a preferred embodiment of the present disclosure, the selection unit 101 may be configured to select a primary system that is closest to the communication system region managed by the another radio resource management system and/or a secondary system that is closest to the communication system region managed by the another radio resource management system and has the highest priority to use the unlicensed spectrum from the at least one primary system, from the at least one secondary system or from the at least one primary system and the at least one secondary system as the at least one object that is liable to be interfered with by the secondary system managed by the another radio resource management system.

For example, the selection unit 101 selects a primary system $PU_0$ and/or a secondary system $SU_0$ that is closest to the communication system region managed by the another radio resource management system from the at least one primary system and/or the at least one secondary system managed by the radio resource management system as the object that is liable to be interfered with by the secondary system managed by the another radio resource management system, and the communication device 20 is configured to transmit geographical location information $L_0$ (for example, a coordinate $(x_0, y_0)$) of the primary system $PU_0$ and/or the secondary system $SU_0$ to the another radio resource management system.

According to another embodiment of the present disclosure, the selection unit 101 is further configured to select at least one object as the at least one object that is liable to be interfered with by the secondary system managed by the another radio resource management system based on, in addition to the geographical location information, reception performance information of the at least one primary system and the at least one secondary system. The reception performance information includes, for example, reception power. The communication device 20 is configured to transmit the reception performance information of the selected at least one object to the another radio resource management system.

The reception performance information includes information for describing situation of a receiver itself (such as a sensitivity and a signal-to-interference and noise ratio requirement) and/or actual reception situation (such as actual reception power and an actual signal-to-interference and noise ratio). The reception power includes a current actual reception power, a historical average value of the reception power, the historical minimum value of the reception power, or a historical value of the reception power with a high probability.

More specifically, the selection unit 101 may select, for example, a primary system $PU_1$ and/or a secondary system $SU_1$ of a current reception signal of which the signal-tointerference and noise ratio is minimum and/or the signal-to-interference and noise ratio requirement is the highest and/or the sensitivity is the worst as the at least one object that is liable to be interfered with by the secondary system managed by the another radio resource management system. In this case, the communication device 20 is configured to transmit reception power $P_1$ of the selected at least one object $PU_1$ and/or $SU_1$ to the another radio resource management system.

The communication device 20 may transmit the geographical location information $L_0$ of the primary system $PU_0$ and/or the secondary system $SU_0$ that is selected by the selection unit 101 to the another radio resource management system along with the reception power $P_1$ of the primary system $PU_1$ and/or the secondary system $SU_1$.

It will be understood by those skilled in the art that the at least one object selected by the selection unit 101 based on the geographical location information of the primary system and the secondary system and the at least one object selected based on the reception performance of the primary system and the secondary system may be the at least one object selected based on different criterions, and may be the same object or different objects.

Further, in a specific example of the present disclosure, the selection unit 101 may firstly select a plurality of objects based on the geographical location information of the primary system and the secondary system, then select the at least one object from the plurality of objects according to the reception performance, and transmit the geographical location information and the reception performance information of the at least one object to the another radio resource management system. It will be understood by those skilled in the art that, the above mentioned order may also be reversed, that is, the selection according to the reception performance may be performed firstly, and then the selection according to the geographical location may be further performed.

According to another embodiment of the present disclosure, the selection unit 101 is further configured to select the at least one object based on priority information of the at least one secondary system. In this case, the communication unit 20 is further configured to transmit the priority information of the selected at least one object to the another radio resource management system. More specifically, the selection unit 101 selects a secondary system with a high priority as the object that is liable to be interfered with by the another radio resource management system based on the priority of the secondary system managed by the radio resource management system 1, such that the communication unit 20 transmits the priority information of the selected secondary system with the high priority to the another radio resource management system.

For example, after the geographical location information and the reception power information of the at least one object that is liable to be interfered with by the secondary system managed by the another radio resource management system is transmitted to the another radio resource management system by the communication unit 20, the another radio resource management system can determine a secondary system that is liable to interfere with the at least one object among the secondary system managed by the another radio resource management system according to related information of the at least one object that is liable to be interfered with, and transmit information of the secondary system to the radio resource management systems 1, 2.

According to an embodiment of the present disclosure, the communication unit 20 is further configured to receive information of the secondary system managed by the another radio resource management system that is liable to interfere with the at least one object from the another radio resource management system, such that the present radio resource management systems 1, 2 determines interference situation of the at least one object that is managed by itself based on the received information.

According to an embodiment of the present disclosure, for example, the another radio resource management system can determine an interference power threshold of the at least one object based on the reception power information of the at least one object received from the radio resource management systems 1, 2. Specifically, for example, the at least one object is a primary system, and the communication quality of the primary system requires that the signal-to-interference and noise ratio requirement of a TV terminal, for example, is common. The another radio resource management system determines the maximum reception power of an interference signal that the object can tolerate, that is, the interference power threshold, according to the known signal-to-interference and noise ratio requirement of the at least one object and the reception power of the object.

In other examples, the radio resource management systems 1, 2 may further send the signal-to-interference and noise ratio requirement of the at least one object as a part of the reception performance information to the another radio resource management system, so as to calculate the interference power threshold. Further, according to the geographical location information of the object (referred to as an object being interfered with below), and based on the interference power threshold and the location information of the respective secondary systems (referred to interfering secondary systems below) managed by the another radio resource management system, the interference on the at least one object by the respective secondary systems can be determined, such that the secondary system that is liable interfere with the at least one object can be determined among the respective secondary systems managed by the another radio resource management system, and information of the secondary system is transmitted to the radio resource management systems 1, 2. For example, according to the geographical location of the interfering secondary system, the another radio resource management system can determine path loss situation when the interfering secondary system transmits a signal, and if a distance from the interfering secondary system to the object being interfered with is long enough such that transmission signal attenuate greatly, and interference power generated by the interfering secondary system that can be received by the object being interfered with does not exceed the interference power threshold, it can be determined that the interfering secondary system does not generate interference to the object.

Additionally, the another radio resource management system can determine the secondary system that is liable to interfere with the object being interfered with among the secondary system managed by the another radio resource management system according to the interference power threshold of at least one object being interfered with by using any known manner. In particular, the another radio resource management system can determine the secondary system that is liable to interfere with the at least one object by using the manner as described according to the second embodiment of the present disclosure (specifically, referring to the description of the radio resource management system according to the second embodiment of the present disclosure below).

Figure 3:
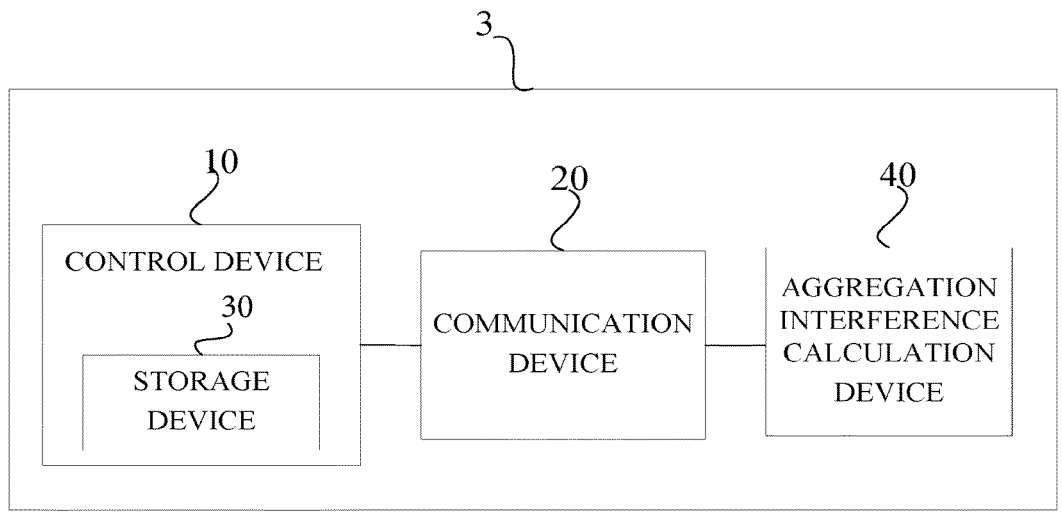
FIG. 3 is still another exemplary block diagram schematically illustrating the radio resource management system according to the first embodiment of the present disclosure.

FIG. 3 is still another exemplary block diagram schematically illustrating the radio resource management system according to the first embodiment of the present disclosure.

As shown in FIG. 3, in addition to the control device 10 and the communication device 20 as those included in the radio resource management system 1 in FIG. 1, the radio resource management system 3 further includes an aggregation interference calculation device 40 for calculating, with respect to each object selected by the selection unit, an aggregation interference on the object generated by a communication system including a secondary system that is managed by another radio resource management system according to information of the secondary system managed by the another radio resource management system that is received by the communication unit.

According to the present disclosure, the aggregation interference calculation device 40 can calculate the aggregation interference on each of at least one object, such as aggregation interference power, according to information of the secondary system that is liable to interfere with the at least one object selected by the selection unit that is received from the another radio resource management system. The aggregation interference calculation device may calculate the aggregation interference of each object by using any well known method in the prior art. According to an embodiment of the present disclosure, the aggregation interference may be calculated by using, for example, a reception power superposition method and a spatial interpolation method. These two aggregation interference calculation methods will be described briefly blow respectively.

According to an embodiment of the present disclosure, the aggregation interference calculation device 40 may calculate the aggregation interference on each object with the following equation (1) according to the reception power superposition method.

$$I_{PU} = \sum_1^n P_r = \sum_1^n P_{SU} C d^{-\alpha} \tag{1}$$

wherein, $$C = \frac{G_t G_r \lambda^2}{(4\pi)^\alpha},$$

$P_{SU}$ is transmission power of an interfering secondary system, Gt and Gr are a transmission antenna gain and a reception antenna gain respectively, d is a propagation distance between the secondary system managed by the another radio resource management system that is liable to interfere with the at least one object managed by the radio resource management system and the at least one object in the radio resource management system, α is a path loss index, n is a number of the secondary systems that are likely to generate an interference on the at least one object among the secondary systems managed by the another radio resource management system.

According to another embodiment of the present disclosure, the aggregation interference calculation device 40 may calculate the aggregation interference of each object by the spatial interpolation method. A principle of the spatial interpolation method is to perform an interpolation by calculating a weighted average of measured values for each point in the vicinity of an unknown point. According to the principle of spatial autocorrelation, the more spatially close to each other, the more similar to each other are articles or phenomena, and thus a weight value obtained from the closest point is the greatest.

Specifically, the aggregation interference calculation device 40 may calculate the aggregation interference power with respect to each object by the following equation (2).

$$P(x, y) = \frac{\sum_{i=1}^N d_i^{-\alpha} P_i}{\sum_{i=1}^N d_i^{-\alpha}} \tag{2}$$

wherein, $P_i$ is a power value measured at a point $(x_i, y_i)$, $d_i$ is a distance between a point (x, y) to be predicted and a reference point $(x_i, y_i)$, N is a number of selected reference points, and α is the path loss index which shall be determined according to particular propagation situation of radio communication wave and is typically determined as 2 in the free space.

When the aggregation interference on each object generated by the secondary system managed by the another radio resource management system is calculated by the aggregation interference calculation device with respect to each object, the radio resource management system can determine a corresponding adjustment scheme according to a relationship between an aggregation interference value and an interference threshold value.

Additionally, although not shown in the figure, the radio resource management system 3 according to the present disclosure may also include the storage device 30 as shown in FIG. 2.

Figure 4:
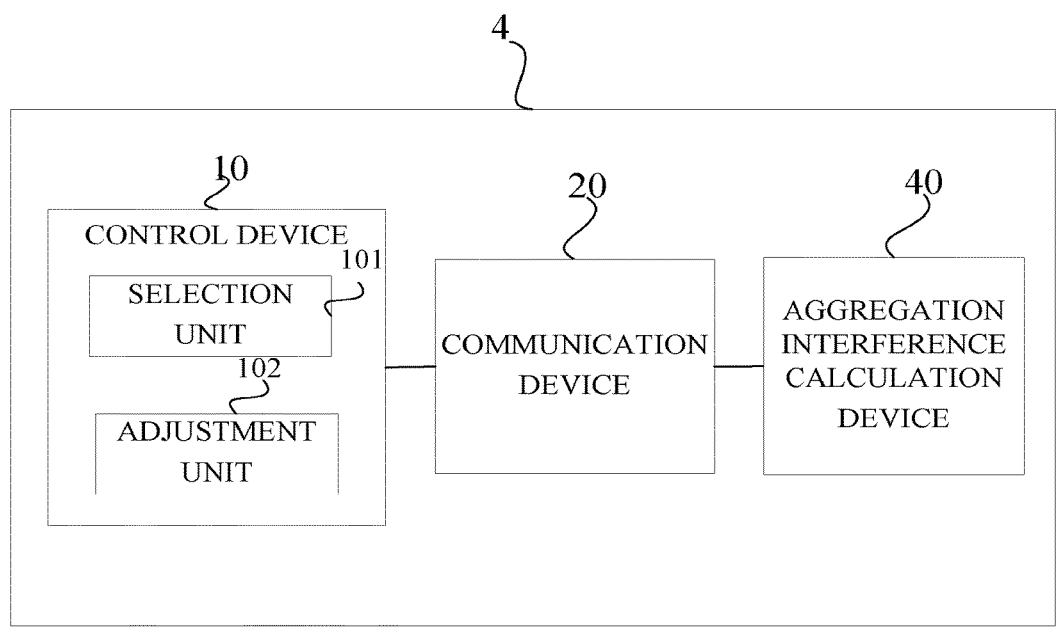
FIG. 4 is still another exemplary block diagram schematically illustrating the radio resource management system according to the first embodiment of the present disclosure.

FIG. 4 is still another exemplary block diagram schematically illustrating the radio resource management system according to the first embodiment of the present disclosure.

As shown in FIG. 4, in addition to the control device 10 including the selection unit 101, the communication device 20 and the aggregation interference calculation device 40 as those included in the radio resource management system 3 in FIG. 3, the control device 10 of the radio resource management system 4 according to the embodiment of the present disclosure further includes an adjustment unit 102 for determining an adjustment to an operational parameter of a secondary system managed by another radio resource management system according to an aggregation interference calculated by the aggregation interference calculation device with respect to each object and an interference power threshold of the object, and generating adjustment information, the operational parameter including at least one of the maximum transmission power and a working channel.

According to the present disclosure, the adjustment unit 102 compares the aggregation interference calculated with respect to each object by the aggregation interference calculation device 40 with the interference power threshold of the object, and if the calculated aggregation interference exceeds the interference power threshold, determines to perform a corresponding adjustment to the operational parameter of the secondary system that is liable to interfere with the object managed by the another radio resource management system for example, to control the maximum transmission power of the secondary system that is liable to generate the interference and the working channel.

More specifically, for example, the corresponding adjustment may be performed to the secondary system that is liable to generate the interference by using the following specific adjustment methods:

(1) reducing transmission power of all the secondary systems that are liable to interfere with the at least one object managed by the another radio resource management system by a first predetermined power value;

(2) reducing transmission power of the first predetermined number of the secondary systems that contribute most to the aggregation interference power of the at least one object managed by the another radio resource management system by a second predetermined power value, wherein the second predetermined power value may be equal to the first predetermined power value or not;

(3) switching one or several secondary systems managed by the another radio resource management system to an other channel (for example, an idle channel); and (4) interrupting transmission of one or several secondary systems managed by the another radio resource management system.

Additionally, the adjustment to the corresponding secondary system may be implemented by combining the above mentioned method (1) or (2) with method (3) or (4).

The adjustment unit 102 can determine an adjustment manner for the operational parameter of the secondary system managed by the another radio resource management system based on the comparison result between the aggregation interference calculated with respect to each object and the interference power threshold of the object, and generate corresponding adjustment information. The adjustment information is sent to the another radio resource management system by the communication device 20, so as to inform the corresponding secondary system to perform a corresponding adjustment.

Although only the case where the secondary system managed by the another radio resource management system determines the aggregation interference on the at least one object that is liable to be interfered with and determines the corresponding adjustment scheme is considered in above description, the present disclosure is not limited thereto. It will be understood by those skilled in the art that, the aggregation interference on the at least one object that is liable to be interfered with by the secondary system managed by the another radio resource management system and other secondary systems managed by the radio resource management systems 1 to 4 may also be considered in combination, and it is determined to adjust the corresponding adjustment scheme according to the aggregation interference correspondingly, for example, to adjust usage of radio resource of the respective secondary systems that generate the aggregation interference (in particular, a secondary system having lower priority than the object that is liable to be interfered with) correspondingly.

In comparison with the prior art, the radio resource management system according to the embodiment of the present disclosure only needs to transmit to the another radio resource management system the related information of the primary system and/or the secondary system that is liable to be interfered with by the secondary system managed by the another radio resource management system, without the information interaction of all the primary systems and the secondary systems with the another radio resource management system, and therefore the information interaction overhead is greatly saved.

Second Embodiment

A configuration of a radio resource management system on an interfering side will be described below.

Figure 5:
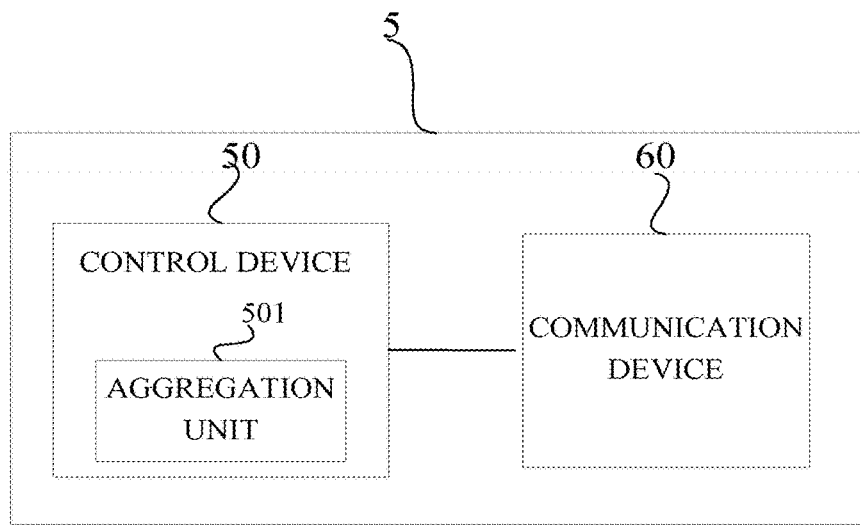
FIG. 5 is an exemplary block diagram illustrating a radio resource management system according to a second embodiment of the present disclosure.

FIG. 5 is an exemplary block diagram illustrating a radio resource management system according to a second embodiment of the present disclosure.

As shown in FIG. 5, the radio resource management system 5 includes a control device 50 for determining, based on geographical location information of at least one secondary system and at least one primary system managed by the radio resource management system, a radio resource that is available to the at least one secondary system among licensed radio resources of the at least one primary system in the case that the primary system is not interfered with, wherein the control device including an aggregation unit 501 for equating at least two secondary systems that are geographically closed to each other among the secondary systems managed by the radio resource management system to one equivalent secondary system, and a communication device 60 for transmitting radio resource usage information and the geographical location information of the equivalent secondary system to another radio resource management system, so as to assist an interference coordination with the another radio resource management system.

As in the first embodiment, the primary system managed by the radio resource management system according to the second embodiment of the present disclosure may be a terrestrial television broadcast system, and the secondary system may be a cognitive radio communication system.

According to an embodiment of the present disclosure, the radio resource usage information of the equivalent secondary system includes transmission power of the equivalent secondary system.

The another radio resource management system according to the embodiment of the present disclosure may be any one of the radio resource management systems 1 to 4 according to the first embodiment of the present disclosure.

According to an embodiment of the present disclosure, the communication device 60 is further configured to receive information of at least one object to be protected among objects managed by the another radio resource management system from the another radio resource management system, wherein the information of the at least one object includes the geographical location information of the at least one object and reception power of the at least one object. For example, the at least one object to be protected may be at least one object (such as the primary system and the secondary system) that is liable to be interfered with by the secondary system managed by the radio resource management system 1 selected by the another radio resource management system according to the above first embodiment. In a simple example, the at least one object to be protected is all the primary systems and/or all the secondary systems managed by the another radio resource management system. The communication device 60 may be configured to receive information of the at least one object to be protected, such as the geographical location information and the reception power, from the another radio resource management system.

Figure 6:
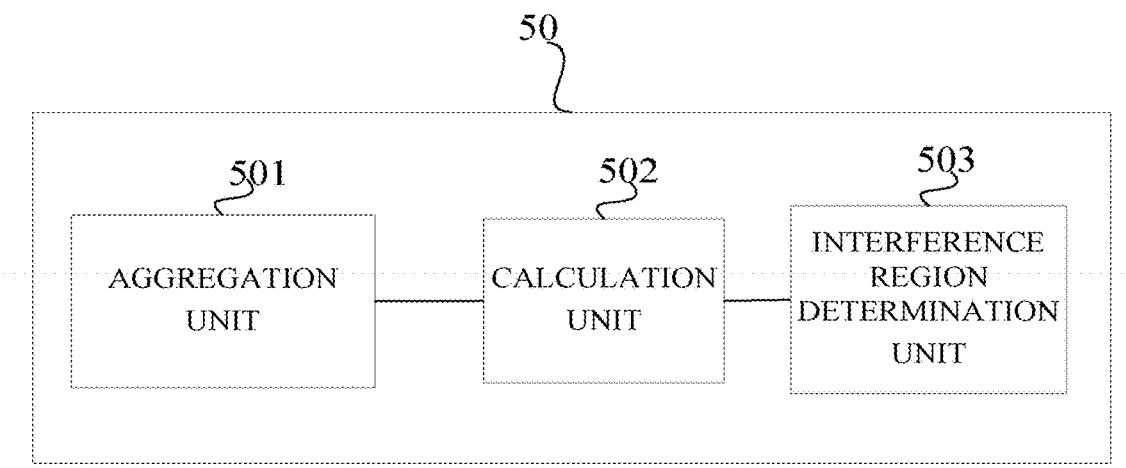
FIG. 6 is another exemplary block diagram illustrating a control device 50 according to the second embodiment of the present disclosure.

FIG. 6 is an exemplary block diagram illustrating the control device 50 according to the second embodiment of the present disclosure.

As shown in FIG. 6, in addition to the aggregation unit 501 as that included in the control device 50 of the radio resource management system 5 in FIG. 5, the control device 50 of the radio resource management system 5 according to the embodiment of the present disclosure further includes a calculation unit 502 for determining, with respect to each of the at least one object, an interference power threshold of the object according to the reception power of the object received by the communication device and a signal-to-interference and noise ratio requirement, and an interference region determination unit 503 for determining, with respect to each of the at least one object, an interference region of the respective secondary systems with respect to the object according to location of each secondary system among the secondary systems managed by the radio resource management system and the interference power threshold of the object.

According to an embodiment of the present disclosure, the calculation unit 502 of the control device 50 may calculate the interference power threshold of each object to be protected according to the reception power P of at least one object to be protected received from the another radio resource management system by the communication device 20. The calculation unit 502 may calculate the interference power threshold of the object to be protected according to the reception power of the object to be protected by using any well known method in the art.

According to an embodiment of the present disclosure, the interference power threshold of the object to be protected may be calculated according to the signal-to-interference and noise ratio requirement for the object to be protected. Specifically, each object to be protected needs to satisfy a requirement for the minimum signal-to-interference and noise ratio ($\alpha$), as shown in equation (3):

$$SINR = \frac{P_r}{I + \sigma^2} \geq \alpha \quad (3)$$

Equation (4) may be derived from the above equation:

$$I \leq P_r/\alpha - \sigma^2 \quad (4)$$

wherein, I is the signal interference power of the interference on the object to be protected, $\sigma^2$ is noise power (it is assume that the noise power is relatively low compared with the interference power and can be omitted), $\alpha$ is the requirement for the minimum signal-to-interference and noise ratio when the primary system or the secondary system (that is, the object to be protected) is normally operating and is typically a fixed value, and $P_r$ is the reception power of the primary system or the secondary system.

$P_1$ is the minimum value of the reception power of the at least one object to be protected, which may be, for example, the reception power of the object with the minimum signal-to-interference and noise ratio as described in the first embodiment of the present disclosure. Therefore, it is required that:

$$I \leq p_1/\alpha \leq P_r/\alpha \quad (5)$$

Thus, with respect to the at least one object, the interference power threshold ($I_0$) thereof can be determined as:

$$I_0 = p_1/\alpha \quad (6)$$

wherein, $I_0$ may be taken as the interference power threshold for all the objects to be protected so as to simplify the calculation.

The interference region determination unit 503 may determine the interference region of the respective secondary systems with respect to each of the at least one object based on the interference power threshold of the at least one object and the location of each secondary system among the secondary systems managed by the radio resource management system 6.

For example, a radius of the interference region may be expressed by a mathematical equation. For example, the interference region may be represented as a circle with the secondary system as the center:

$$(x-x_i)^2 + (y-y_i)^2 \leq r_1^2 \quad (7)$$

wherein, $r_1$ is the maximum value of inequation (7). For example, it can be obtained according to the following equation (8), $$r_1 = \sqrt[\alpha]{\frac{K}{I_0}} \quad (8)$$

wherein, K is a constant that is related to transmission power $P_t$, an antenna gain, and the like.

According to another embodiment of the present disclosure, the interference region of the secondary system may also be determined from a path loss of the secondary system, such as $$P_t - PL > I_0 \quad (9)$$

wherein, PL is the path loss of the secondary system and may be determined from the following equation (10). $P_t$ is the transmission power of the secondary system managed by the radio resource management system.

$$PL = A^* \log_{10}(d) + B^* \log_{10}(f) + C \quad (10)$$

wherein, the equation (10) may be calculated by selecting a suitable channel model according to specific location environment in which the secondary system is located, or may be obtained by looking up a known path loss table.

If there is a receiver within a range of the interference region determined according to the above method, the reception power of the receiver with respect to the signal transmitted by the interfering secondary system is greater than the interference power threshold. Therefore, if the location of the object to be protected is within the interference region, the radio resource management system can determine that the above interfering secondary system may generate an interference to the object to be protected.

Although the case where the interference power threshold with respect to the at least one object is calculated by the calculation unit in the control device 50 of the radio resource management system 6 has been described above, the present disclosure is not limited thereto. The interference power threshold of the at least one object may also be calculated by the another radio resource management system according to the reception power of at least one object managed by the another radio resource management system, and the calculated interference power threshold may be received from the another radio resource management system by the communication device 60.

The aggregation unit 501 may be configured to equate, with respect to each of the at least one object, at least two secondary systems of which coverage ranges of the interference regions are overlapped among the respective secondary systems to one equivalent secondary system according to the interference regions of the respective secondary systems with respect to the object.

In the case that the aggregation unit 501 equates the at least two secondary systems of which the coverage ranges of the interference regions are overlapped to the one equivalent secondary system, the interference region determination unit 503 is further configured to equate the location of the secondary system which is closest to a communication system region managed by the another radio resource management system among the at least two secondary systems having been equated to the one equivalent secondary system to the location of the equivalent secondary system, and add the transmission power of the at least two secondary systems together to equate to the transmission power of the equivalent secondary system, so as to determine the interference region of the equivalent secondary system.

For example, the transmission power of the at least two secondary systems having been equated to the one equivalent secondary system can be added together by multiplying an average power of the at least two secondary systems by a number of the secondary systems (that is, performing a simple superposition), by multiplying the maximum power among the at least two secondary systems by the number of the secondary systems, by weighting power of the at least two secondary systems, in which a distance from the secondary system to the at least one object may be taken as a weight for the weighting, or the like.

More specifically, for example, $$\sqrt[\alpha]{n_1}\, r_1$$

may be equated to the radius of the interference region of the equivalent secondary system, and $n_1 \times P_t$ may be equated to the transmission power of the equivalent secondary system, such that the interference region of the equivalent secondary system is determined. Wherein, $n_1$ is equated to the number of the secondary systems of the one equivalent secondary system, $r_1$ is equated to the radius of the interference region of the secondary system that is closest to the communication system region managed by the another radio resource management system among the at least two secondary systems equated to the one equivalent secondary system, a is equated to the path loss index of the secondary system that is closest to the communication system region managed by the another radio resource management system among the at least two secondary systems equated to the one equivalent secondary system, and Pt is equated to the maximum transmission power or the average transmission power of the at least two secondary systems equated to the one equivalent secondary system.

For example, in the case that at least two secondary systems of which the coverage ranges of the interference regions are overlapped are equated to one equivalent secondary system, the radius of the interference region of the secondary system that is closest to the communication system region managed by the another radio resource management system among the at least two secondary systems may be increased by $$\sqrt[\alpha]{2}$$

times. In the case that three secondary systems are equated to one equivalent secondary system, the radius of the interference region of the secondary system that is closest to the communication system region managed by the another radio resource management system among the three secondary systems is increased by $$\sqrt[\alpha]{3}$$

times, wherein the minimum value of α is 2.

The information interaction of all the secondary systems managed by the radio resource management system can be avoid by virtualizing a plurality of secondary systems of which the coverage ranges of the interference regions are overlapped to one equivalent secondary system, and transmitting the related information of the equivalent secondary system to the another radio resource management system by the communication device 60, and there is just a need for the information interaction of the equivalent secondary systems, such that the information interaction overhead between the radio resource management systems is reduced.

Figure 7:
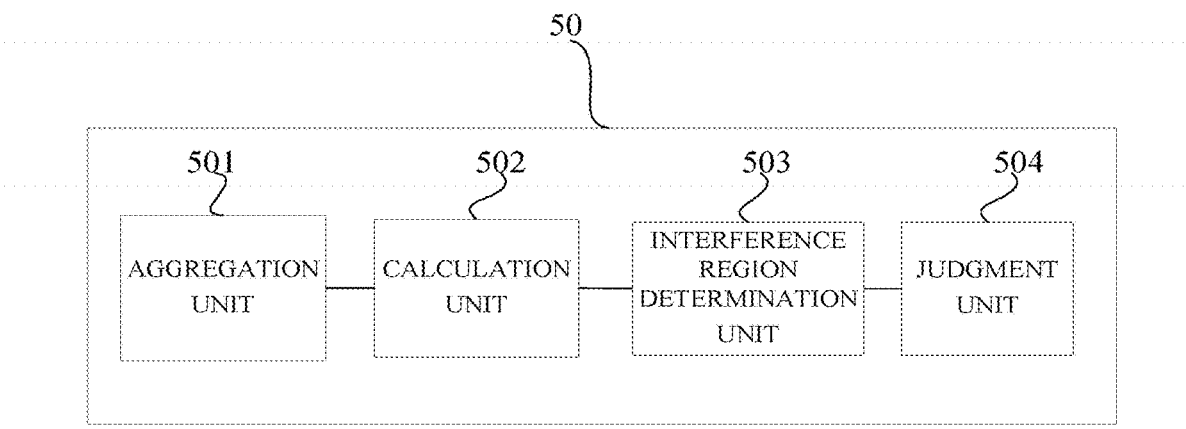
FIG. 7 is still another exemplary block diagram illustrating the control device 50 according to the second embodiment of the present disclosure.

FIG. 7 is another exemplary block diagram illustrating the control device 50 according to the second embodiment of the present disclosure.

As shown in FIG. 7, in addition to the aggregation unit 501, the calculation unit 502 and the interference region determination unit 503 as those included in the control device 50 of the radio resource management system 6 in FIG. 6, the control device 50 further includes a judgment unit 504 for judging whether the interference region of the respective secondary systems including all the equivalent secondary systems covers the at least one object or not.

Specifically, according to the geographical location information of the at least one object received by the communication device from the another radio resource management system, the judgment unit 504 may be configured to judge whether the object which is closest to the communication system region managed by the radio resource management system among communication systems managed by the another radio resource management system is within the interference region of the respective secondary systems including the equivalent secondary system or not.

According to the present disclosure, the judgment unit 504 is configured to determine that the secondary system is liable to generate interference on the at least one object in case of judging that the interference region covers the at least one object, such that the information of the secondary system including the equivalent secondary system corresponding to the interference region is transmitted to the another radio resource management system by the communication device 60. If the judgment unit 504 judges that the interference region does not cover the at least one object, it is determined that the secondary system including the equivalent secondary system corresponding to the interference region is not liable to generate interference on the at least one object, and in this case, the communication device 60 needs not to transmit the information of the secondary system including the equivalent secondary system corresponding to the interference region to the another radio resource management system.

Figure 8:
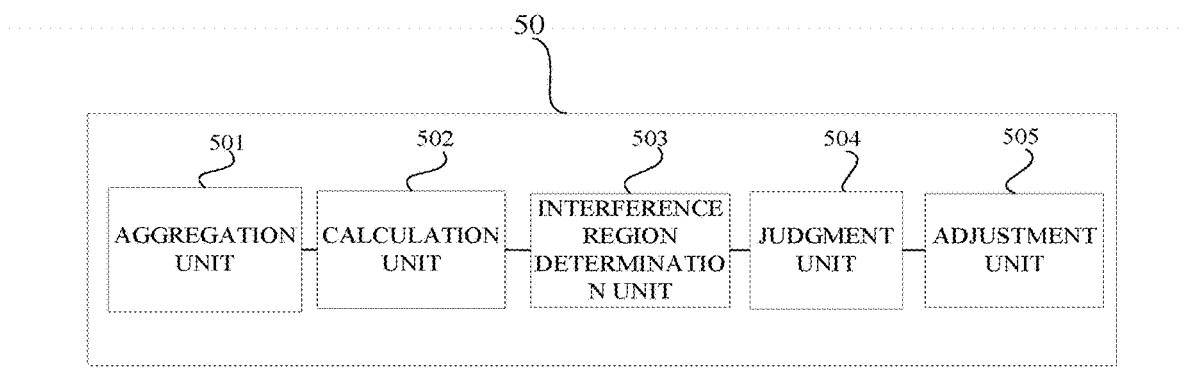
FIG. 8 is still another exemplary block diagram illustrating the control device 50 according to the second embodiment of the present disclosure.

FIG. 8 is still another exemplary block diagram illustrating the control device 50 according to the second embodiment of the present disclosure.

As shown in FIG. 8, in addition to the aggregation unit 501, the calculation unit 502, the interference region determination unit 503 and the judgment unit 504 as those included in the control device 50 in FIG. 7, the control device 50 further includes an adjustment unit 505 for performing an adjustment to usage of radio resource by the secondary system managed by the radio resource management system according to adjustment information received by the another radio resource management system.

According to an embodiment of the present disclosure, the communication unit 60 is further configured to receive the adjustment information that is determined based on the aggregation interference (for example, the aggregation interference may be calculated from the information of the secondary system that is liable to generate interference on at least one object to be interfered with, which is transmitted by the radio resource management systems 5, 6) of the at least one object to be interfered with and the interference threshold from the another radio resource management system, such that the adjustment unit 505 performs the adjustment to the usage of radio resource of the corresponding secondary system according to the received adjustment information.

For example, when the adjustment information is to reduce the transmission power of all the secondary systems by a first predetermined power value, the adjustment unit 505 may reduce the transmission power of all the secondary systems managed by the radio resource management system 5 by the first predetermined power value.

Through the adjustment to the usage of radio resource of the respective secondary systems by the adjustment unit 505 according to the adjustment information received from the another radio resource management system, it is possible to maintain the interference of the secondary systems managed by the radio resource management system on the at least one object to be protected managed by the another radio resource management system to be within a tolerable range.

Figure 9:
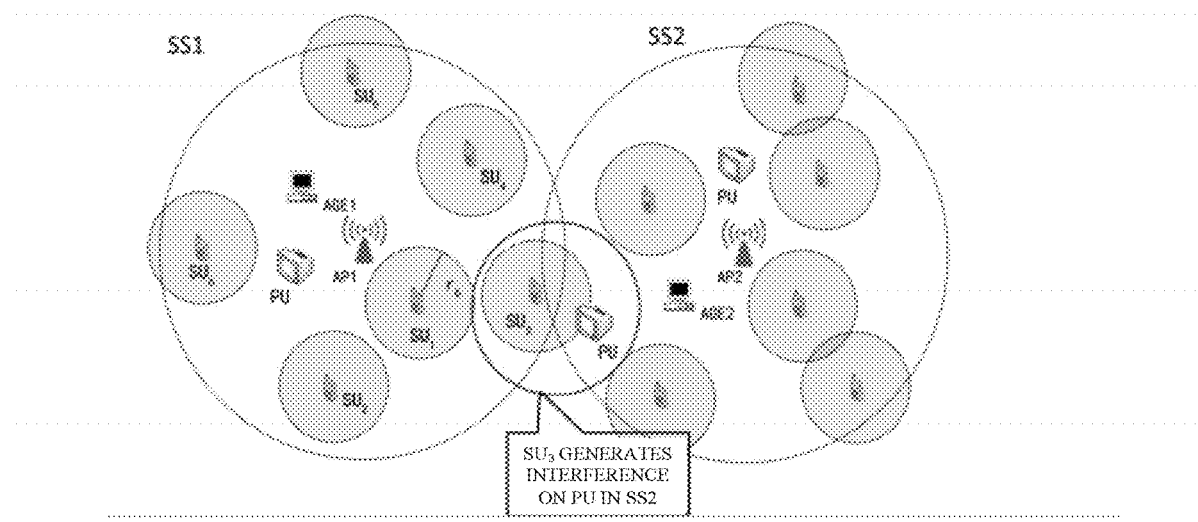
FIG. 9 is a diagram illustrating an interference between radio resource management systems and interference regions of respective secondary systems.

FIG. 9 is a diagram illustrating an interference between radio resource management systems and interference regions of respective secondary systems.

SS1 indicates regions of the primary system and the secondary system managed by the radio resource management system on an interfering side (such as the radio resource management system 5 according to the second embodiment of the present disclosure), SS2 indicates regions of the primary system and the secondary system (including the object to be protected) managed by the radio resource management system on a side being interfered with (such as the radio resource management systems 1 to 4 according to the first embodiment of the present disclosure), and the shaded region in FIG. 9 indicates an interference region of a corresponding secondary system with respect to at least one object managed by an adjacent radio resource management system.

As shown in FIG. 9, the communication device 60 of the radio resource management system 5 can receive the geographical location information of the object to be protected from the adjacent radio resource management system thereof (in the example shown in FIG. 9, for example, the primary system $PU_1$), and the interference region determination unit 503 of the control device 50 can determine an interference range of the respective secondary systems to the primary system $PU_1$ according to the geographical location information of the object to be protected and the interference threshold, as shown in the shaded region in FIG. 7. Since the interference range of the secondary system $SU_3$ covers the primary system $PU_1$ that is the object to be protected, the communication device 60 can transmit the information of the secondary system $SU_3$ to the radio resource management system on the side being interfered with, and receive the adjustment information indicating that the radio resource management system on the side being interfered with determines to perform an adjustment to the usage of radio resource of the secondary system $SU_3$ according to the aggregation interference of the primary system $PU_1$ and the interference threshold, such that the adjustment unit 505 of the control device 50 performs the adjustment to the usage of radio resource of the secondary system $SU_3$ according to the received adjustment information.

Through further selection by the radio resource management systems 5 to 8, there is only a need for an information interaction of the secondary system that may generate a harmful interference (including the equivalent secondary system) between the radio resource management systems 5 to 8 and the another radio resource management system, such that the information interaction overhead between the radio resource management systems is further reduced.

It shall be understood by those skilled in the art that, the aggregation unit 501 may also not be disposed in the radio resource management system of the present embodiment, and the equivalent secondary system is not determined, the radio resource management system operates just according to the above described flow, such as, receives the information of the object to be protected, determines the interference power threshold of the object to be protected, determines the interference region, and determines the information of the secondary system that will generate an interference on the another radio resource management system, and performs the corresponding interaction with the another radio resource management system. Although the embodiments of the present disclosure have been described above with respect to the radio resource management system on the interfering side and the radio resource management system on the side being interfered with respectively, it will be understood by those skill in the art that the secondary system managed by the radio resource management system on the side being interfered with may also generate an interference on the primary system and secondary system of the adjacent radio resource management system thereof, and therefore the radio resource management system on the side being interfered with may also be the radio resource management system on the interfering side at the same time. In other words, the control device in the radio resource management systems according to the embodiment of the present disclosure described with reference to FIGS. 1 to 4 may also have the function of the control device described with reference to FIGS. 5 to 8, that is, the control device 10 described with reference to FIGS. 1 to 4 may also include the aggregation unit 501, the calculation unit 502 and the interference region determination unit 503 described with reference to FIGS. 5 to 8. Vice versa, the control device 50 described with reference to FIGS. 5 to 8 may also include the selection unit 101 and the adjustment unit 102 described with reference to FIGS. 1 to 4.

Figure 10:
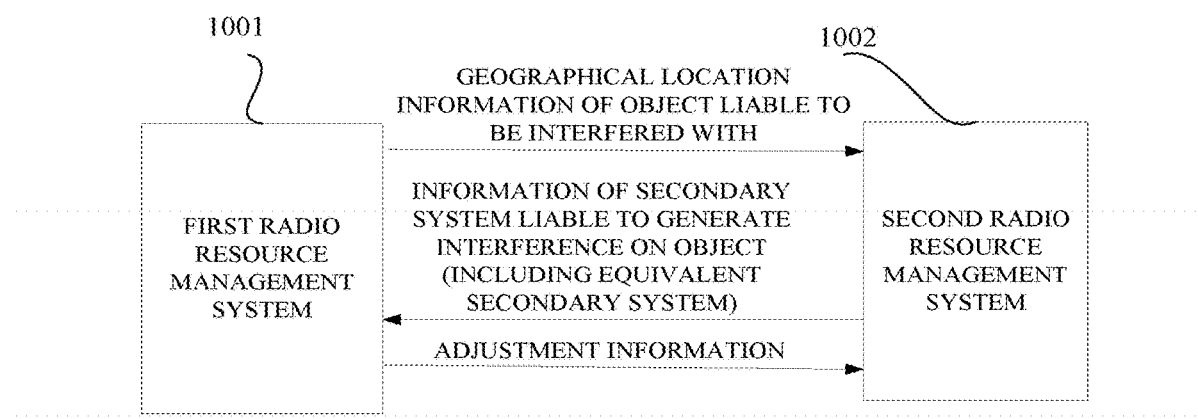
FIG. 10 is a diagram illustrating an information interaction between a radio resource management system and an adjacent radio resource management system according to an embodiment of the present disclosure.

FIG. 10 is a diagram illustrating an information interaction between a radio resource management system and an adjacent radio resource management system according to an embodiment of the present disclosure.

As shown in FIG. 10, an first radio resource management system 1001 transmits geographical location information of at least one object selected based on location information of a primary system and a secondary system managed by itself to an adjacent second radio resource management system 1002, the second radio resource management system 1002 determines an interference range on the at least one object by the secondary system managed by itself according to an interference threshold value of the at least one object and transmits related information of the secondary system (including the equivalent secondary system, which is an equivalent secondary system that can virtualize several secondary systems to one secondary system because the interference ranges are overlapped) of which the interference range covers the at least one object to the first radio resource management system 1001 based on the interference ranges of the respective secondary systems, and the first radio resource management system 1001 can calculate an aggregation interference on the at least one object based on the received related information of the secondary system that is liable to interfere with the at least one object and determine an adjustment to usage of radio resource of the respective secondary systems managed by the second radio resource management system 1002 based on the aggregation interference on the at least one object and the interference threshold value thereof, so as to send adjustment information to the second radio resource management system 1002 and adjust the usage of radio resource by a corresponding secondary system.

According to the present disclosure, various configurations of the above respective systems, devices, units according to the embodiment of the present disclosure can be implemented by a software design, a hardware combination or a combination of hardware and software.

According to an embodiment of the present disclosure, there is also provided a radio resource management method for a radio resource management system on a side being interfered with. An exemplary process of the radio resource management method for the radio resource management system on the side being interfered with will be described below in connection with FIG. 11.

Figure 11:
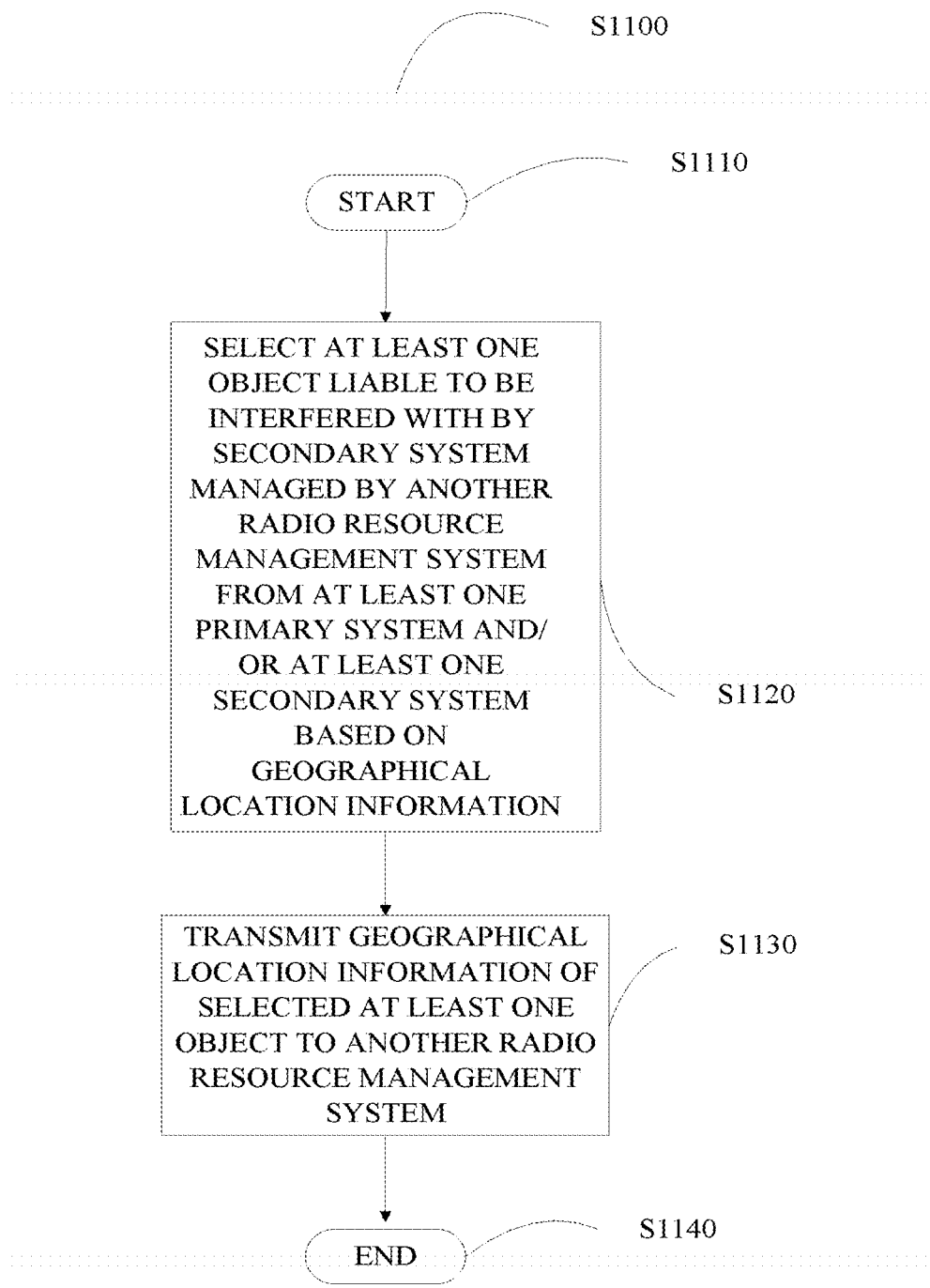
FIG. 11 is a flowchart schematically illustrating a radio resource management method according to an embodiment of the present disclosure.

As shown in FIG. 11, a process flow 1100 of the radio resource management method according to the embodiment of the present disclosure starts at S1110, and then processing of S1120 is performed.

In a control step of S1120, a radio resource that is available to at least one secondary system among licensed radio resources of at least one primary system in the case that the primary system is not interfered with is determined based on geographical location information of the at least one secondary system and the at least one primary system managed by the radio resource management system, wherein, the control step includes selecting at least one object that is liable to be interfered with by the secondary system managed by another radio resource management system from the at least one primary system, from the at least one secondary system, or from the at least one primary system and the at least one secondary system based on the geographical location information. The control step of S1120 can also refer to the operation of the control device 10 and the selection device 101 described with reference to FIGS. 1 to 4, and the detailed description thereof is omitted herein. Then a transmission step S1130 is performed.

In the transmission step of S1130, the geographical location information of the at least one object selected in the control step of S1120 is transmitted to the another radio resource management system. Then S1140 is performed.

The process flow 1100 ends at S1140.

According to an embodiment of the present disclosure, there is also provided a radio resource management method for a radio resource management system on an interfering side. An exemplary process of the radio resource management method for the radio resource management system on the interfering side will be described below in connection with FIG. 12.

Figure 12:
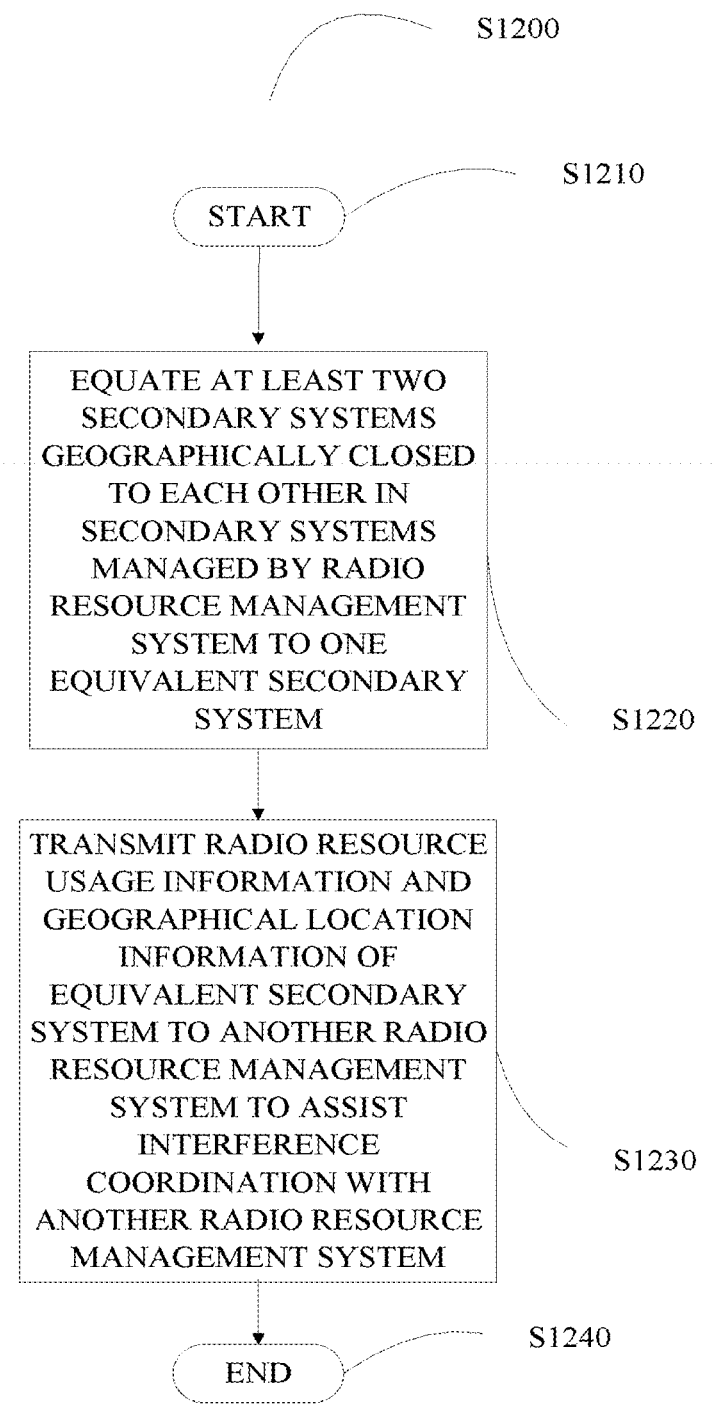
FIG. 12 is a flowchart schematically illustrating a radio resource management method according to another embodiment of the present disclosure.

As shown in FIG. 12, a process flow 1200 of the radio resource management method according to the embodiment of the present disclosure starts at S1210, and then a control step of S1220 is performed.

In the control step of S1220, a radio resource that is available to at least one secondary system among licensed radio resources of at least one primary system in the case that the primary system is not interfered with is determined based on geographical location information of the at least one secondary system and the at least one primary system managed by the radio resource management system, wherein the control step of S1220 includes equating at least two secondary systems that are geographically closed to each other among the secondary systems managed by the radio resource management system to one equivalent secondary system. The control step of S1220 can also refer to the operation of the control device 50 and the aggregation unit 501 described with reference to FIGS. 5 to 8, and the detailed description thereof is omitted herein. Then a transmission step of S1230 is performed.

In the transmission step of S1230, radio resource usage information and the geographical location information of the equivalent secondary system are transmitted to another radio resource management system, so as to assist an interference coordination with the another radio resource management system. Then S1240 is performed.

The process flow 1200 ends at S1240.

The radio resource management system and the radio resource management method according to the embodiment of the present disclosure can reduce interaction overhead between the radio resource management system and an adjacent radio resource management system thereof in case of ensuring that an interference on an object managed by the radio resource management system by an secondary system managed by the adjacent radio resource management system is within a tolerable range, such that the overhead of data information interaction is substantially reduced on the premise of ensuring communication quality of the object managed by the radio resource management system.

Example Of Application Scenario

The radio resource management system according to the present disclosure is particularly applicable for an application scenario in which the primary system is a terrestrial television broadcast system and the secondary system is a cognitive radio communication system. Wherein, the cognitive radio communication system can be implemented by a mobile communication system constituted by a WIFI communication system, a small cell base station and a user thereof.

Figure 13:
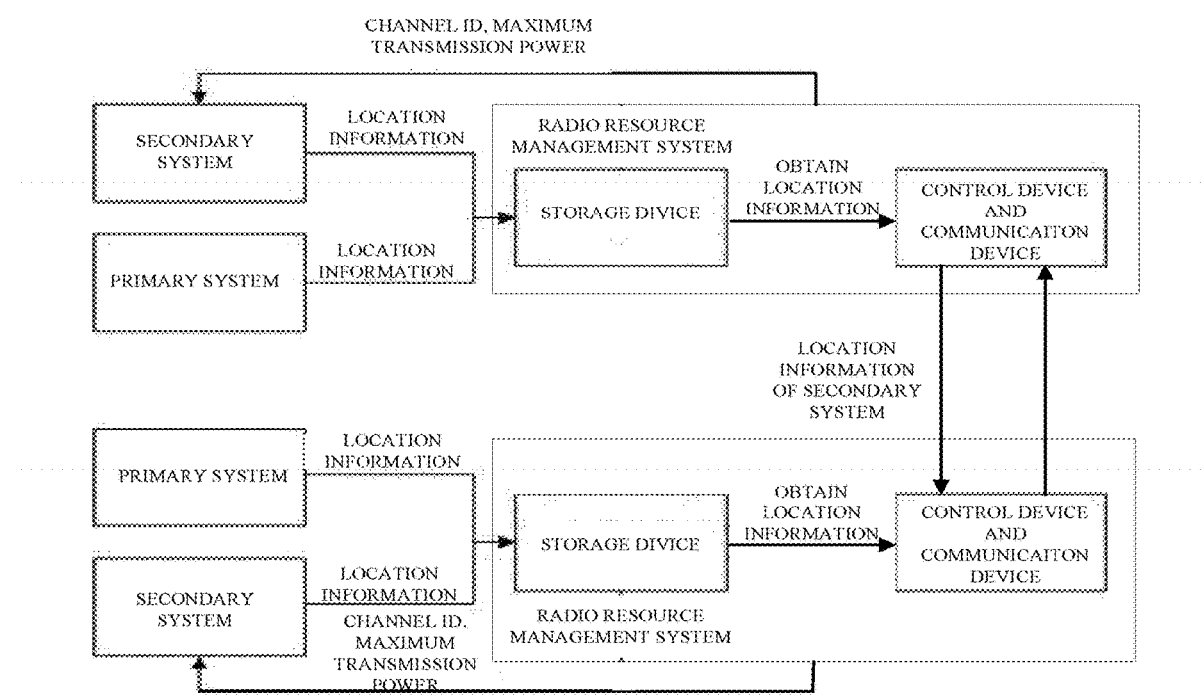
FIG. 13 is a system diagram illustrating an information interaction between different radio resource management systems.

FIG. 13 is a system diagram illustrating an information interaction between different radio resource management systems.

As shown in FIG. 13, a radio resource management system on a side being interfered with obtains from a primary systems and a secondary systems managed by itself their geographical location information and stores it in a storage device, a control device obtains the geographical location information of the primary system and the secondary system by accessing the storage device and selects the geographical location information of at least one object (such as the primary system and the secondary system to be protected) according to the obtained geographical location information, and the communication device transmits the geographical location information of the at least one object to an adjacent radio resource management system (that is, the radio resource management system on an interfering side). The radio resource management system on the interfering side may receive the transmitted geographical location information of the at least one object and judge the secondary system that is liable to interfere with the at least one object accordingly, such that information of the secondary system is transmitted to the radio resource management system on the side being interfered with. The radio resource management system on the side being interfered with determines an adjustment scheme to the secondary system based on the received information of the secondary system that is liable to interfere with the at least one object, and transmits corresponding adjustment information to the radio resource management system on the interfering side, and the radio resource management system on the interfering side sends an channel ID and maximum transmission power corresponding to the adjustment information to the secondary system to be adjusted.

It will be understood by those skilled in the art that, the radio resource management system on the interfering side and the radio resource management system on the side being interfered with can be interchanged, that is, the secondary system managed by the radio resource management system on the side being interfered with can also generate an interference on the primary system and the secondary system managed by the radio resource management system on the interfering side.

Respective component units, subunits in the above radio resource management system according to the above embodiments of the present disclosure can be configured by way of software, firmware, hardware, or any of combinations thereof. In the case of software or firmware implementation, programs constituting the software or firmware are installed to a machine with a dedicated hardware structure from a storage medium or a network, wherein the machine can execute various corresponding functions of the component units, subunits when being installed various programs.

Figure 14:
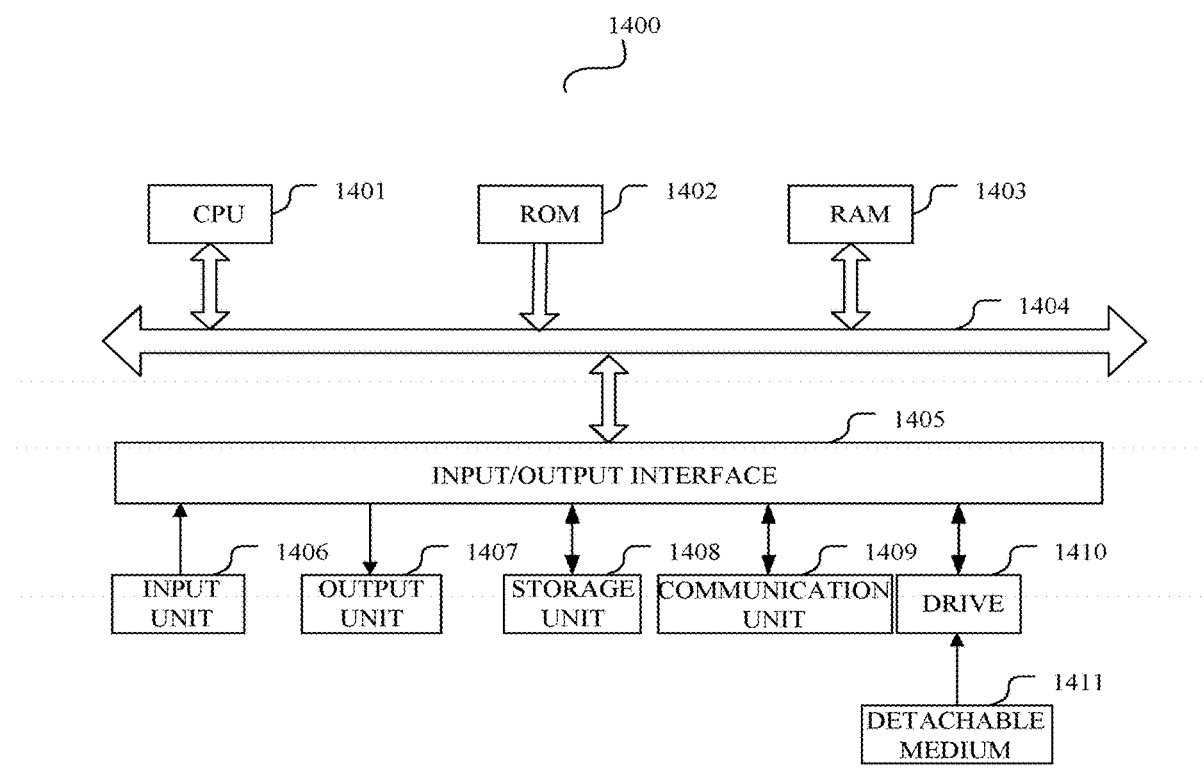
FIG. 14 is a simplified structure diagram illustrating a possible hardware configuration of an information processing apparatus for implementing the radio resource management system and the radio resource management method according to the embodiments of the present disclosure.

FIG. 14 is a simplified structure diagram illustrating a possible hardware configuration of an information processing apparatus for implementing the radio resource management system and the radio resource management method according to the embodiments of the present disclosure.

In FIG. 14, a central processing unit (CPU) 1401 perform various processes according to programs stored in a Read-Only Memory (ROM) 1402 or programs loaded from a storage unit 1408 to a Random Access Memory (RAM) 1403. According to requirement, the RAM 1403 also stores data required when the CPU 1401 performs various processes. The CPU 1401, ROM 1402 and RAM 1403 are connected from one to another via a bus 1404. An input/output interface 1405 is also connected to the bus 1404.

The following components are connected to the input/output interface 1405: an input unit 1406 (including a keyboard, a mouse, etc.); an output unit 1407 (including a display, such as a cathode ray tube (CRT) display, a liquid crystal display (LCD), etc., and a speakers and so on); a storage unit 1408 (including a hard disc, etc.); and a communication unit 1409 (including a network interface card such as a LAN card, a modem and so on). The communication unit 1409 performs a communication process via a network like the Internet. According to requirement, a drive 1410 may also be connected to the input/output interface 1405. A detachable medium 1411 such as a disc, a CD, a magneto-optical disc, a semiconductor memory, and so on is installed on the drive 1410 based on requirement, such that computer programs read out therefrom are installed in the storage unit 1408 based on requirement.

In case of implementing the above processes by software, programs constituting the software are installed from a network like the Internet or from a storage medium like the detachable medium 1411.

Those skilled in the art should be understood that such storage medium is not limited to the detachable medium 1411 which is stored with programs and distributes separately from the apparatus to provide a user with the programs as illustrated in FIG. 14. An example of the detachable medium 1411 includes a disc (including a floppy disc (Registered Trademark)), a CD (including a CD read only memory (CD-ROM) and a digital versatile disc (DVD)), a magneto-optical disc (including a mini-disc (MD) (Registered Trademark)) and a semiconductor memory. Alternatively, the storage medium may be the ROM 1402, or a hard disc included in the storage unit 1408 in which a program is stored and the program is distributed to a user with the apparatus including the same.

The present disclosure also provides a program product storing machine readable instruction code. When read and executed by a machine, the instruction code may implement the radio resource management system and the radio resource management method according to the above embodiments of the present disclosure. Correspondingly, various storage mediums for carrying the program product such as a magnetic disk, an optical disk, a magneto-optical disk, a semiconductor memory, etc. are also included in the present disclosure.

Additionally, the present technology may also be configured as below.

1. A radio resource management system, including:
a circuit, configured to:
determine, based on geographical location information of at least one secondary system and at least one primary system managed by the radio resource management system, a radio resource that is available to the at least one secondary system among licensed radio resources of the at least one primary system in the case that the primary system is not interfered with, the determining including selecting at least one object that is liable to be interfered with by the secondary system managed by another radio resource management system from the at least one primary system, from the at least one secondary system, or from the at least one primary system and the at least one secondary system based on the geographical location information; and
transmit the geographical location information of the selected at least one object to the another radio resource management system.

2. A radio resource management system, including:
a circuit, configured to:
determine, based on geographical location information of at least one secondary system and at least one primary system managed by the radio resource management system, a radio resource that is available to the at least one secondary system among licensed radio resources of the at least one primary system in the case that the primary system is not interfered with, the determining including equating at least two secondary systems that are geographically closed to each other among the secondary systems managed by the radio resource management system to one equivalent secondary system; and
transmit radio resource usage information and the geographical location information of the equivalent secondary system to another radio resource management system, so as to assist an interference coordination with the another radio resource management system.

In the above description of the specific embodiments of the present disclosure, features that are described and/or illustrated with respect to one implementation may be used in a same or similar way in one or more other implementations and/or in combination with or instead of features of other implementations.

Furthermore, the method according to the embodiments of the present disclosure shall not be limited to being performed only in the chronological sequence described in the specification or drawings, but can also be performed in another chronological sequence, concurrently or separately. Therefore, the technical scope of the present disclosure will not be limited by the sequence in which the method is performed as described in the specification.

Additionally, it is obvious that each operational process of the aforementioned method according to the present disclosure can also be realized in the form of a computer-executable program stored in various machine-readable storage media.

In addition, the objects of the present disclosure can also be achieved by the following way: directly or indirectly supplying the storage medium storing the aforementioned executable program code to a system or apparatus, reading and executing the program code by a computer or a central processing unit (CPU) in the system or apparatus.

In this case, as long as the system or the apparatus possesses the function to execute programs, embodiments of the present disclosure are not restricted to the program, and the program may also assume any form, such as target program, interpreter-executed program, or script program supplied to an operating system, etc.

The aforementioned machine-readable storage media include, but are not limited to, various memories and storage units, semiconductor apparatuses, magnetic units such as optical, magnetic and magneto-optical disks, as well as other media adapted to storing information.

Finally, as should be further explained, such relational terms as left and right, first and second, etc., when used in the present disclosure, are merely used to differentiate one entity or operation from another entity or operation, without necessarily requiring or suggesting that these entities or operations have therebetween any such actual relation or sequence. Moreover, terms 'include', 'include' or any variants thereof are meant to cover nonexclusive inclusion, so that processes, methods, objects or devices that include a series of elements not only include these elements, but also include other elements not explicitly listed, or further include elements inherent in the processes, methods, objects or devices. Without more restrictions, an element defined by the sentence 'including a . . . ' does not preclude the further inclusion of other identical elements in the processes, methods, objects or devices that include this element.

Although the present disclosure has been disclosed above by the description of specific embodiments of the present disclosure, it will be understood that those skilled in the art can design various modifications, improvements and equivalents of the present disclosure within the spirit and scope of appended claims. Such modifications, improvements and equivalents should also be regarded as being covered by the protection scope of the present disclosure.

The invention claimed is:

1. A radio resource management system, comprising:
   circuitry including at least a processor and a memory, the circuity configured to:
   equate at least two secondary systems to an equivalent secondary system, wherein coverage ranges of the at least two secondary systems overlap, the at least two secondary systems are of a plurality of secondary systems that are managed by the radio resource management system, and the equivalent secondary system has a coverage range spanning the coverage ranges of the at least two secondary systems; and
   transmit radio resource usage information and geographical location information of the equivalent secondary system to another radio resource management system to assist an interference coordination with the another radio resource management system, wherein
   the geographical location information indicates a location of the equivalent secondary system,
   the location of the equivalent secondary system is based on location information of the at least two secondary systems, and
   the location including at least X and Y coordinates of the equivalent secondary system.

2. The radio resource management system according to claim 1, wherein
   the radio resource usage information of the equivalent secondary system includes a transmission power of the equivalent secondary system, and
   the transmission power of the equivalent secondary system is calculated based on a transmission power of each of the at least two secondary systems.

3. The radio resource management system according to claim 1, wherein
   the circuitry is further configured to receive information of at least one object to be protected among objects managed by the another radio resource management system from the another radio resource management system, and
   the information of the at least one object includes geographical location information of the at least one object and a reception power of the at least one object.

4. The radio resource management system according to claim 3, wherein the circuitry is further configured to:
   determine, with respect to the at least one object, an interference power threshold of the at least one object according to the reception power of the at least one object and a signal-to-interference and noise ratio (SINR) requirement; and
   determine, with respect to each object of the at least one object, an interference region of the secondary systems with respect to the object according to a location of the secondary systems among the secondary systems managed by the radio resource management system and the interference power threshold of the object.

5. The radio resource management system according to claim 4, wherein the circuitry is further configured to equate the at least two secondary systems to the equivalent secondary system according to the interference region with respect to the object.

6. The radio resource management system according to claim 5, wherein the circuitry is further configured to
   equate a location of a secondary system, which is closest to a communication system region managed by the another radio resource management system, from among the at least two secondary systems, and
   add a transmission power of the at least two secondary systems together to calculate a transmission power of the equivalent secondary system, so as to determine the interference region of the equivalent secondary system.

7. The radio resource management system according to claim 4, wherein the circuitry is further configured to judge whether the interference region of the respective secondary systems including all the equivalent secondary systems covers the at least one object or not.

8. The radio resource management system according to claim 7, wherein the circuitry is further configured to judge whether an object, which is closest to a communication system region that is managed by the radio resource management system and among communication systems managed by the another radio resource management system, is within the interference regions of the respective secondary systems including the equivalent secondary system or not.

9. The radio resource management system according to claim 7, wherein the circuitry is further configured to, in the case that the interference region covers the at least one object, transmit information of the equivalent secondary system corresponding to the interference region to the another radio resource management system.

10. The radio resource management system according to claim 1, wherein a secondary system is a radio communication system.

11. The radio resource management system according to claim 1, wherein the circuitry is further configured to
- determine a transmission power of the equivalent secondary system according to transmission powers of the at least two secondary systems, and
- determine an interference region of the equivalent secondary system according to the transmission power of the equivalent secondary system.

12. A radio resource management method, comprising:
- equating at least two secondary systems to an equivalent secondary system, wherein coverage ranges of the at least two secondary systems overlap, the at least two secondary systems are of a plurality of secondary systems that are managed by a radio resource management system, and the equivalent secondary system has a coverage range spanning the coverage ranges of the at least two secondary systems; and
- transmitting radio resource usage information and geographical location information of the equivalent secondary system to another radio resource management system to assist an interference coordination with the another radio resource management system, wherein
- the geographical location information indicates a location of the equivalent secondary system,
- the location of the equivalent secondary system is based on location information of the at least two secondary systems, and
- the location including at least X and Y coordinates of the equivalent secondary system.

13. The radio resource management method according to claim 12, further comprising:
- determining a transmission power of the equivalent secondary system according to transmission powers of the at least two secondary systems; and
- determining an interference region of the equivalent secondary system according to the transmission power of the equivalent secondary system.

\* \* \* \* \*